Dec. 5, 1933.                E. KRAMAR                1,938,073
                         ELECTRIC WAVE FILTER
                         Filed March 29, 1932
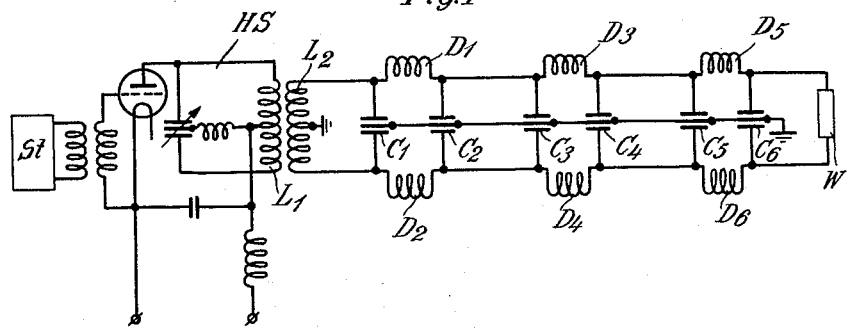
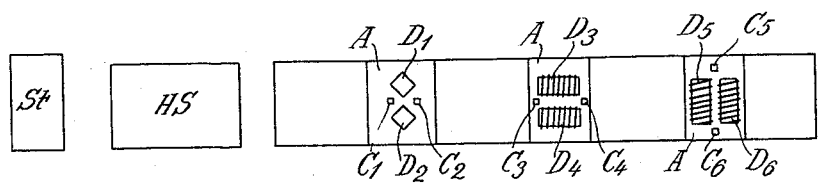
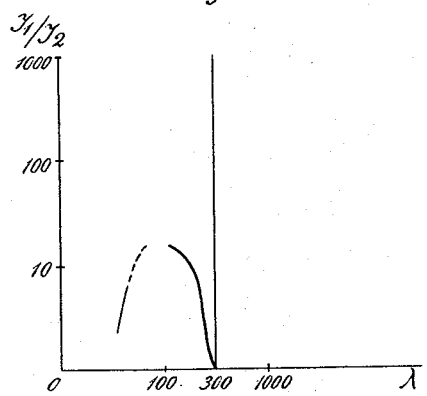
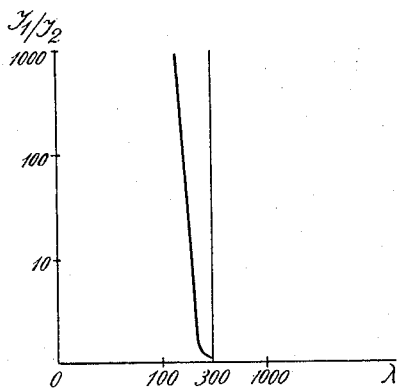
Inventor:
Ernst Kramar
by R.C. Hopgood
Attorney Patented Dec. 5, 1933

1,938,073

UNITED STATES PATENT OFFICE 1,938,073

ELECTRIC WAVE FILTER

Ernst Kramar, Berlin-Tempelhof, Germany, assignor to C. Lorenz Aktiengesellschaft, Berlin-Tempelhof, Germany, a company Application March 29, 1932, Serial No. 601,778, and in Germany April 2, 1931

3 Claims. (Cl. 178—44)

It is well-known that in wireless transmitters harmonic oscillations are generated in addition to the operating wave. The frequencies of these harmonics are often within the range of the short waves at present used in wireless telegraphy and may, if radiated, therefore cause serious interference with the latter. For this reason, filter arrangements such as are used in amplifiers etc., have been provided in the transmitting apparatus, the purpose of which was to suppress the harmonics to some extent. With the further development of large transmitters, particularly for broadcasting, the choke filters hitherto used are, however, insufficient to remove the disturbances completely. It is necessary that the amplitude of the fundamental wave is to that of the first upper harmonic in the ratio of, say, 1000:1 at the end of the filter provided for suppressing these harmonics. This very strict condition has been imposed in view of the fact that the high frequencies happen to be those which are very easily propagated. To understand the necessity for these strict conditions, it is only necessary to consider the small amounts of energy which are frequently employed in short-wave communication. As has already been mentioned, the arrangements hitherto employed do not satisfy these conditions, since the choke arrangements commonly used have been simply those used in the low frequency art on a correspondingly larger scale.

The condition mentioned can be satisfied by a filter constructed according to the present invention, wherein all the sections of the filter are made perfectly symmetrical in both the electrical sense and with respect to their surroundings. The individual sections are preferably screened from one another, so that interference between the filter stages and any influence of its surroundings on the filter is avoided to the greatest possible extent. In order that this and the following description may be well understood, the following is to be noted:

Every line, inductance, condenser etc., has capacity with respect to its sourroundings in addition to its internal capacity. These capacities with respect to the surroundings cause the development of disturbing harmonics, since oscillatory circuits for short-waves are formed therethrough. When the arrangement is made perfectly symmetrical with respect to space, however, the development of such oscillations is impossible and the above conditions can be satisfied.

The invention will be more clearly understood from the following description and be particularly pointed out in the appended claims, reference being had to the accompanying drawing in which Fig. 1 is a wiring diagram by which one form of construction of a filter according to the invention is shown in connection with a high frequency transmitter. Fig. 2 is a diagrammatic plan to Fig. 1. Figs. 3 and 4 illustrate the improvement obtained by means of the invention. Fig. 3 relates to prior wave filters, Fig. 4 to a filter constructed according to this invention.

The arrangement shown in Figs. 1 and 2 is as follows.

A main transmitter HS connected in well-known manner is associated with a controlling transmitter St or the like, and is provided with an output inductance $L_1$ which is coupled to the input inductance $L_2$ of the filter. It is advantageous in this case to make the output circuit of the transmitter electrically symmetrical, for instance by providing coil $L_1$ with a center tapping, as shown in Fig. 1.

The filter is composed of three sections. One of these comprises two inductances or choke coils D1, D2 and two condensers C1, C2. The second section consists of two coils D3, D4 and two condensers C3, C4. The third section is comprised of two coils D5, D6 and two condensers C5, C6. The coils of each section are disposed opposite each other so as to form two lines of inductances. The condensers are arranged transversely of these lines. Each of such filter sections is thus symmetrical in itself. The condensers are, moreover, so connected to the inductances D1 to D6, that the connections between them and their associated inductances be as short as possible. The centres of the condensers C1 to C6 are connected together and to earth. Further balancing of the arrangement is obtained by earthing the centre of the coil $L_2$. The output circuit of the filter is terminated by a suitable resistance W, but a second filter of the same construction may be connected after it, the limiting frequency of which is different from that of the first, in order to remove further disturbances. This construction is not shown because it involves a mere aggregation of what is represented by Fig. 1.

The measure of making the device symmetrical in space arrangement may be effected in various ways. If there is a sufficiently large surrounding space, it is not necessary to take any special precautions, but care should be taken that the surroundings of the coils D1 to D6 are such that no potential differences may arise due to different space capacities. If this cannot be realized, it is advantageous to produce space-symmetry artificially by screening the coils. This as indicated in Fig. 2 can be done by disposing each of the said filter sections symmetrically in a casing A. Such casings act to distribute the earth's potential equally over the coils. If no casing is employed, it is advantageous to arrange each pair of coils D1, D2 or D3, D4 or D5, D6 with their axes parallel to one another, so that a closed magnetic circuit is produced, in order to reduce as far as possible any influence on the coils of adjacent filter sections. Such arrangement will be evident from Fig. 2. In order to decouple the filter sections still further, the axes of the coils of each section may be arranged inclined to those of the other sections. They may, for example, be disposed at right angles thereto, as will be seen from Fig. 2. Here, the coils D1 and D2 are vertical, whilst the coils D3, D4, D5 and D6 are placed horizontally, but in such a manner that the coils D3, D4 on the one hand and the coils D5, D6 on the other hand are perpendicular to one another. Fig. 2 also shows a symmetrical arrangement of the condensers C1 to C6. These measures are also of advantage when the casings A are not fully effective for any reason. They are, however, to be regarded more as a refinement for fulfilling the highest demands.

In Figs. 3 and 4, the relation of input current J1 to output current J2 is illustrated. The curves here shown are plotted on a logarithmic scale. It is seen that a filter of the earlier construction with exactly the same dimensioning has a substantially flatter curve and even has a descending branch, whilst the new filter has a very much steeper rise and no descending branch.

The values shown in Figs. 3 and 4 were derived from a working wave of $\lambda = 276$ m.

Changes may be made within the scope indicated by the appended claims, without departing from the spirit or sacrificing any of the advantages of this invention.

What is claimed is:

1. In an electric wave filter, an input circuit earthed at the centre, filter sections each comprising inductances and capacities, these inductances and capacities so distributed therein that each section is symmetrical in itself, and provisions whereby such sections are made symmetrical with respect to their surroundings.

2. In an electric wave filter, filter sections each composed of coils and condensers, both these means so distributed therein that each section is symmetrical in itself, the coils of each section positioned angularly with respect to those of the other sections, and provisions whereby such sections are made symmetrical with respect to their surroundings.

3. An electric wave filter comprising a plurality of sections each section comprising a plurality of inductance coils serially disposed in opposite sides of a circuit and condensers connected in bridge thereof, said inductance coils and condensers of each section being so disposed that each section is symmetrical within itself, said inductance coils being further so disposed that the coils within a section have parallel axes which are positioned angularly with respect to the axes of the coils of adjacent sections.

ERNST KRAMAR.